United States Patent
Obert

(10) Patent No.: US 7,640,551 B2
(45) Date of Patent: Dec. 29, 2009

(54) SYSTEM AND METHOD FOR ASYNCHRONOUS REPORTING OF PRINTER MAINTENANCE DATA FOR A PRINTER

(75) Inventor: James E. Obert, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1606 days.

(21) Appl. No.: 10/458,449

(22) Filed: Jun. 9, 2003

(65) Prior Publication Data
US 2004/0246520 A1  Dec. 9, 2004

(51) Int. Cl.
G06F 3/00 (2006.01)
G03G 15/00 (2006.01)
G06K 15/00 (2006.01)

(52) U.S. Cl. .................. 719/318; 399/10; 399/23; 358/1.14

(58) Field of Classification Search ............... 358/1.14, 358/1.6, 1.15; 399/70, 8, 24; 709/318, 202, 709/224; 710/19
See application file for complete search history.

(56) References Cited

U.S. PATENT DOCUMENTS

| | | | |
|---|---|---|---|
| 6,182,157 B1 * | 1/2001 | Schlener et al. ............ | 719/318 |
| 6,427,053 B1 * | 7/2002 | Eck et al. ................... | 399/10 |
| 6,714,744 B2 * | 3/2004 | Arima ......................... | 399/23 |
| 6,947,155 B2 * | 9/2005 | Haines ....................... | 358/1.14 |

OTHER PUBLICATIONS

Website for Cisco: "Tech Note Cisco IOS SNMP Traps Supported and How to configure Them," dated May 9, 2003.
Website for Dell, "Configuring SNMP Traps Using Dell OpenManage Server Administrator," dated May 9, 2003.

* cited by examiner

Primary Examiner—David K Moore
Assistant Examiner—Neil R McLean

(57) ABSTRACT

A system and method is provided for asynchronous reporting of printer maintenance data in a printer. The method can include the operation of setting a hardware trap for a printer power-on event in the printer. The hardware trap is configured to report to a harvesting server in response to generation of the hardware trap. A further operation is generating the printer power-on event using the hardware trap when the printer is powered-on. Another operation is collecting printer maintenance data in response to the printer power-on event. In addition, the printer maintenance data that has been collected is sent to the harvesting server in order to update the printer maintenance data stored by the harvesting server.

25 Claims, 3 Drawing Sheets

SYSTEM AND METHOD FOR ASYNCHRONOUS REPORTING OF PRINTER MAINTENANCE DATA FOR A PRINTER

FIELD OF THE INVENTION

The present invention relates generally to reporting of printer maintenance data.

BACKGROUND

Electronic printing devices have become an integral part of many business environments. Most businesses that use paper in their workflow tend to create documents using an electronic printer and these printers are frequently connected to a computer network. Electronic printers are becoming more widely used as the technology becomes generally accepted, but the use of these printers can add up to a significant cost for any business. Businesses may use laser printers, dot matrix printers, inkjet printers, plotters, large format printers and other electronic printers which all incur costs when they are used.

In order to aid customers and businesses in managing and controlling the cost of their printing systems, printer vendors offer contract service plans which assist customers with the maintenance and upkeep of their printers. These printer management contracts help reduce the complexity of printer management and can cut the bottom-line printer costs for businesses. Printer management contracts can include a complete usage-based package including the latest printer hardware technology, printer cartridges, maintenance, and a high level of quality support. A printer management service also helps manage user efficiency and control print related expenses.

A printer management contract generally provides services and supplies to a business over a specific term (e.g., a one-year contract term). One goal of these services is to reduce per page printing costs, simplify print management, and streamline administration for the customer. By using planned print services, businesses can reduce printer downtime, improve business budgeting, and provide a constant support service for all of the printing needs of a business. In addition, customers often contract for a specific amount of printer consumables in advance, such as toner, and the customer may receive a volume rate for the consumables.

Another aim of a printer vendor is to provide a printer support contract that includes all the diverse aspects of printer management. As mentioned, this support often includes hardware, consumables, installation, support, and maintenance (including parts and labor). Businesses benefit from this type of tightly coupled service and support by keeping printers running at high performance and preventing printer downtime due to a lack of printer cartridges, maintenance kits, or functional printers. A service contract benefits the printer vendor because a fixed service contract can provide a constant stream of revenue for the vendor.

In order to service customer printer contracts, a printer vendor typically collects data from each printer covered by the printer vendor's service contract regarding the printer's current maintenance status. The collection of the printer maintenance information is often performed by a harvesting server. The harvesting server can be configured to poll each of a customer's printers on a specific network at least once during a given time interval to determine the printer maintenance status. For example, the polling may take place once every 24 hours or once a week. Checking the printer maintenance status includes determining whether the printer is functioning properly and what the current state of consumables is for a specific printer. For example, the central harvesting server can request information from the printer regarding the toner level, ink level, number of copies printed, the length of time remaining for a drive belt, and similar maintenance information.

One of the problems encountered with the polling method for harvesting printer information is that if the customer's printers are powered-off when polling takes place, the printers will not be accessible using the standard discovery and data harvesting network protocols. This can especially be a problem because the polling preferably takes place at night or on the weekend in order to help reduce network traffic.

When the printer vendor has contracted with a customer to poll their printers at least once per time interval (e.g., each day) and the printers are powered-off, then the printers cannot be polled. This data inaccessibility creates a service problem for the printer vendor. Typically the information that is gathered by the harvesting server is used to predict when toner, ink or maintenance kits are to be ordered for the contracted printers or printing devices. If this data is not available because the printers are powered-off, then the consumables and maintenance kits cannot be ordered on behalf of the customer. In addition, regular maintenance services are not likely to be performed in a timely manner. Thus, the printer vendor is not able to fulfill the contract as agreed. Further, the consumables, maintenance kits, and needed services may be delayed for any number of days as long as the printer is powered-off during the polling period. This situation may occur regardless of whether the polling period is at night or in the daytime. Printer vendors with a printer management contract want to be able to service the customer in a timely manner in order to keep the customer happy and maximize the efficiency of the customer's printing systems. Unfortunately, providing high quality print management services can be difficult if the appropriate printer data cannot be harvested.

SUMMARY OF THE INVENTION

The invention provides a system and method for asynchronous reporting of printer maintenance data in a printer. The method can include the operation of setting a hardware trap for a printer power-on event in the printer. The hardware trap is configured to report to a harvesting server in response to generation of the hardware trap. A further operation can be generating the printer power-on event using the hardware trap when the printer is powered-on. Another operation is collecting printer maintenance data in response to the printer power-on event. In addition, the printer maintenance data that has been collected is sent to the harvesting server in order to update the printer maintenance data stored by the harvesting server.

DETAILED DESCRIPTION

Figure 1:
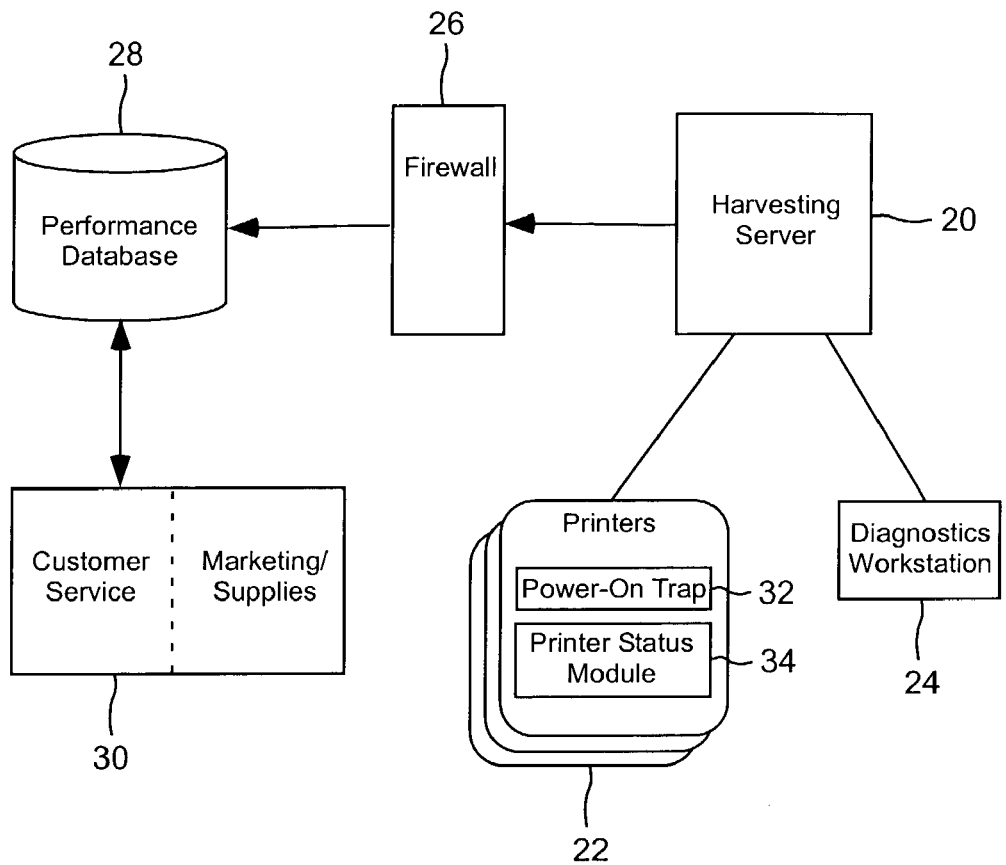
FIG. 1 is a block diagram illustrating a system for asynchronous reporting of printer maintenance data in a printer using a power-on hardware trap in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A prior system and method for capturing printer maintenance data has been to synchronously poll printers that are covered by a service contract in order to obtain their printer maintenance data. Typically, a scheduled polling time has been established for collecting the printer maintenance data from the printers that are being serviced by a printer vendor. The scheduled polling time has allowed the printer vendor to make an attempt to check each printer at least once within a given time period.

Periodic polling is often performed at night because this is a time when the customer's network traffic and server loads are likely to be the lowest. Unfortunately, customers are also likely to turn off their printers and printing devices at night to conserve power. When printers are powered-off during the harvesting of printer maintenance data, then the known discovery and data harvesting network protocols are not accessible for the printer. This lack of data accessibility creates problems with printers that are under a service contract with the printer vendor. If the printer is not powered-on when a scheduled data harvest begins, the information for that printer or printing device cannot be transmitted back to the printer vendor. Since the printer vendor will not receive the printer maintenance data when a printer is turned off, there is no data to determine whether or not the appropriate consumables, replacement parts and services should be provided.

For example, a printer may be scheduled to have its printer maintenance data harvested each week on Monday night. If the printer is turned off on Monday night when the harvesting is scheduled to take place, then the printer will wait a whole week before it is checked again. During that interim period, the printer may run out of toner or have other maintenance problems that could have been foreseen using the remote printer management system. Furthermore, if the printer or printing device has a consumable that should have been replaced but was not, then the customer will probably be unhappy with the printer management contract and services provided by the printer vendor.

In order to overcome the problems described and to provide an efficient printer management system, the present invention provides a system and method for asynchronous reporting of printer maintenance data as illustrated in FIG. 1. The system includes one or more printers 22 having a hardware trap 32 set to capture a printer power-on event. A hardware trap can be created by using a monitoring protocol which governs network management and the monitoring of network devices. The term hardware trap is defined relatively broadly in the context of this description, because the hardware trap itself does not necessarily have to be implemented in hardware. For example, the trap may be a software implemented trap that monitors specific printer hardware and software functions. Alternatively, the trap can be stored in firmware or loaded from a non-volatile storage medium such as a storage disk when the printer is powered-on. The specific information the hardware trap collects can stored in volatile RAM, Flash RAM, or on some other non-volatile memory.

Examples of monitoring and communication protocols that the present invention can use are the Simple Network Management Protocol (SNMP) or a proprietary hardware management communication interface. SNMP includes a set of standards for network management including a communication protocol, a database structure specification, and a set of data objects. Regardless of what communication protocol is used, the hardware trap can be implemented to communicate over many different types of networks including but not limited to TCP/IP, IPX/SPX, and similar networking protocols.

Hardware and network management systems, such as SNMP, can provide an agent that is a piece of software or firmware which resides on a network node or printer and is responsible for communicating with what is known as a manager for that node. The node is represented as a managed object having various fields or variables that are defined. The agent can respond to requests from the managers by supplying or changing the values of the object's variables as requested. In addition, the agent can generate traps to alert managers of noteworthy events occurring at the node, such as a component failure. Generally, the manager requests information from the agent and the agent then responds. However, agents can issue messages without a corresponding request. Such a message is known as a trap, and traps exist to handle specific hardware or computing conditions. Thus, the trap can be a hardware agent, firmware agent, a software agent or some combination of these.

Referring again to FIG. 1, the printer 22 is configured to report to a harvesting server 20 in response to the generation of the printer power-on event by the hardware trap or power-on trap 32. This reporting capability enables the printer to report to the harvesting server or workstation with the predefined hardware trap whenever power is restored to a printer. The printer can send a message to the harvesting server that the printer is "awake" followed by the printer maintenance data. Alternatively, the printer can simply send the printer maintenance data to the harvesting server when the printer is powered-on. The printer described here can be a laser printer, inkjet printer, dot matrix printer, large format plotter, network enabled copier or any other similar multi-function printing device.

A printer status module 34 can be located with the printer and configured for collecting printer maintenance data in response to the printer power-on event. The function of the printer status module includes collecting the printer maintenance data by using the printer testing hardware that is built in to a given printer. Examples of hardware conditions that the printer hardware is capable of testing are levels of toner, paper, remaining imaging drum life, and remaining transfer belt life. The printer status module can be part of the printer's firmware, software, hardware, or it may be running on a printer server coupled to the printer.

In one embodiment, the printer maintenance data includes the status of printer consumables. Printer consumables include items such as toner, ink, printer maintenance kits, printer drums, printer belts, and printer replacement parts. In addition to parts and materials, the printer maintenance data can include the number of pages printed, the number of hours the printer has been powered-on and similar data. Service information can be included in the printer maintenance data such as the time remaining or number of pages to be printed before the next service call. Correlating the rate at which consumables are used or pages are printed can help a printer vendor send consumables in a timely manner or schedule the next printer service call.

The harvesting server 20 is included for receiving printer maintenance data from the printers to update the stored printer maintenance data. The harvesting server can be a stand-alone server, a workstation on the network, or a proprietary networked device. The printer maintenance data can be sent to the harvesting server using a network communication protocol. Examples of network communication protocols that can be used for sending printer maintenance data are hypertext transfer protocol (HTTP), XML, open database connectivity (ODBC), file transfer protocol (FTP), secure HTTP, secure email or unsecured email.

The harvesting server is valuable because the harvesting server can be used to communicate through the firewall 26 and because it can function as a central repository of the printer maintenance data collected from tens or hundreds of networked printers. Additional functionality can be included in the harvesting server for formatting and interpreting the printer maintenance data after the printer maintenance data is received by the harvesting server. Interpretation of the printer maintenance data is useful because the raw data received from the printer hardware traps can be analyzed to provide detailed information about the printers or customers. The hardware traps can return information about the ink levels, toner levels, paper, remaining imaging drum life, or transfer belt life and this information can be analyzed by the harvesting server. A diagnostics workstation 24 can be provided that is in communication with the harvesting server 20 and the workstation can enable a customer to view the information stored in the central harvesting server and/or possibly maintain the harvesting server.

The system further comprises a performance database 28 that is located with a printer vendor and the performance database is configured to collect printer maintenance data from one or more harvesting servers. The performance database can collect the printer maintenance data from harvesting servers for multiple customers, and this provides a central storage area for the printer maintenance data that is accessible to the printer vendor. The performance database can be located on a network that is physically or logically separated from the networks where the harvesting servers are located. For example, the performance database and harvesting software will often be on opposite sides of a firewall.

A customer service center 30 is provided that is enabled to order and/or send printer consumables to a customer site. The consumables can be ordered for a printer based on the printer maintenance data received into the performance database 28. The customer service center can be a software application that is connected to the performance database. In addition, the customer service center may include a marketing and supplies module 30 which enables the printer vendor to market specific products to a customer based on the supplies they are using or the projected needs of the customer. For example, the marketing module can be used to send email promotions to a customer regarding new printing products.

The present embodiment of the invention is valuable because it enables printer maintenance data to be sent asynchronously without the concern of data delay when a printer is not able to be harvested. Since this embodiment of the invention allows the data to be reported when the printer power is turned on, this increases the quality and frequency of the printer data reporting. This embodiment can be combined with the known polling systems to help ensure that a printer will not be missed unless there is a printer hardware failure or network failure. One result of this constant reporting by the printers is that the end customer is more likely to avoid printer downtime or service delays. In addition, the customer does not need to stock an inventory of printer consumables because the printer consumables can be delivered in a "just in time" mode.

Since the present invention provides a highly reliable system and method of obtaining printer maintenance data, a printer vendor is better able to service printer maintenance contracts, which keeps the printer vendor's customers satisfied. Even if a printer misses one or more polling or harvesting cycles, the printer will report to the harvesting server as soon as it is powered-on. This also means that the present invention enables a printer vendor to generate more consistent revenues because the printer vendor will order printer consumables and schedule maintenance visits in a more timely manner.

Another embodiment of the present invention can send information using a hardware trap which reports at a more granular level than discussed previously. This particular embodiment can be used without employing a power-on trap for the printer hardware. Rather, an asynchronous hardware trap is set for specific printer events that the printer vendor desires to monitor. The system for transferring the printer maintenance data benefits from the responsive asynchronous nature of the invention and the data can be analyzed and reported soon after the printer events happen.

Figure 2:
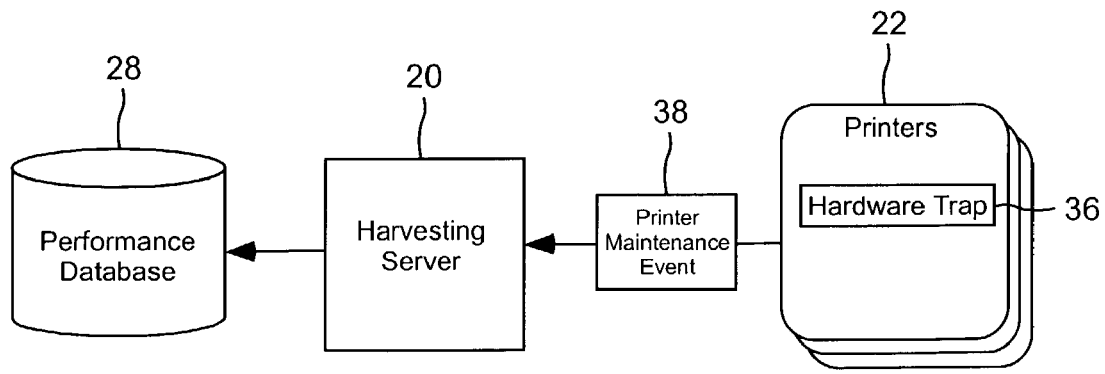
FIG. 2 is a block diagram illustrating an embodiment of a system for asynchronous reporting of printer maintenance data in a printer using a hardware trap.

FIG. 2 illustrates that one or more printers 22 can have a hardware trap set 36 to capture a printer maintenance event 38. In this embodiment, one printer maintenance event at a time may be captured or the printer maintenance events may be captured in small groupings. In contrast, the embodiment in FIG. 1 captures all the printer maintenance data at one time. Examples of events that may be captured are toner or ink level events, page printing milestones, printer jams, printer maintenance needs and similar printer hardware events. The present embodiment can set the hardware trap to report the printer consumable data and printer maintenance data when the event occurs. For example, the printer may report when the printer actually registers that the toner has fallen below 10% full or when the printer feed system has repeatedly jammed.

A harvesting server 20 is configured for receiving a printer maintenance event 38 from the printer to update the printer maintenance data. The printer is also configured to report printer maintenance events to the harvesting server in response to the generation of specific consumables or maintenance hardware traps. A performance database 28 is provided and the performance database is located with a printer vendor. The performance database can be generally configured to collect printer maintenance events from the harvesting server.

A customer service center (not shown in FIG. 2) can be enabled to send printer consumables to a client site for the printer based on the printer maintenance events received in the performance database. In other words, the printer vendor may have employees or a sales force who use software applications to monitor the performance database and help decide when printer consumables should be sent to the customer. Of course, the automated system can be programmed to send printer consumables when specific conditions exist but the actual human operators of this system can have the ability to check and modify the orders where appropriate.

Providing an asynchronous reporting system and method for individual printer maintenance events enables printer maintenance data to be captured in a highly accurate manner. Furthermore, the present embodiment is valuable because it enables printer maintenance data to be sent asynchronously without regard to setting an exact time for the harvesting of the data. Using a hardware trap for each maintenance event or small group events may generate more hardware traffic than a power-up hardware trap that sends all the printer maintenance data together. However, the use of a harvesting server may be eliminated in this embodiment because the hardware traps can be configured to report directly to the performance database at the printer vendor's site and the functionality of the harvesting server and the performance database can be combined together.

Figure 3:
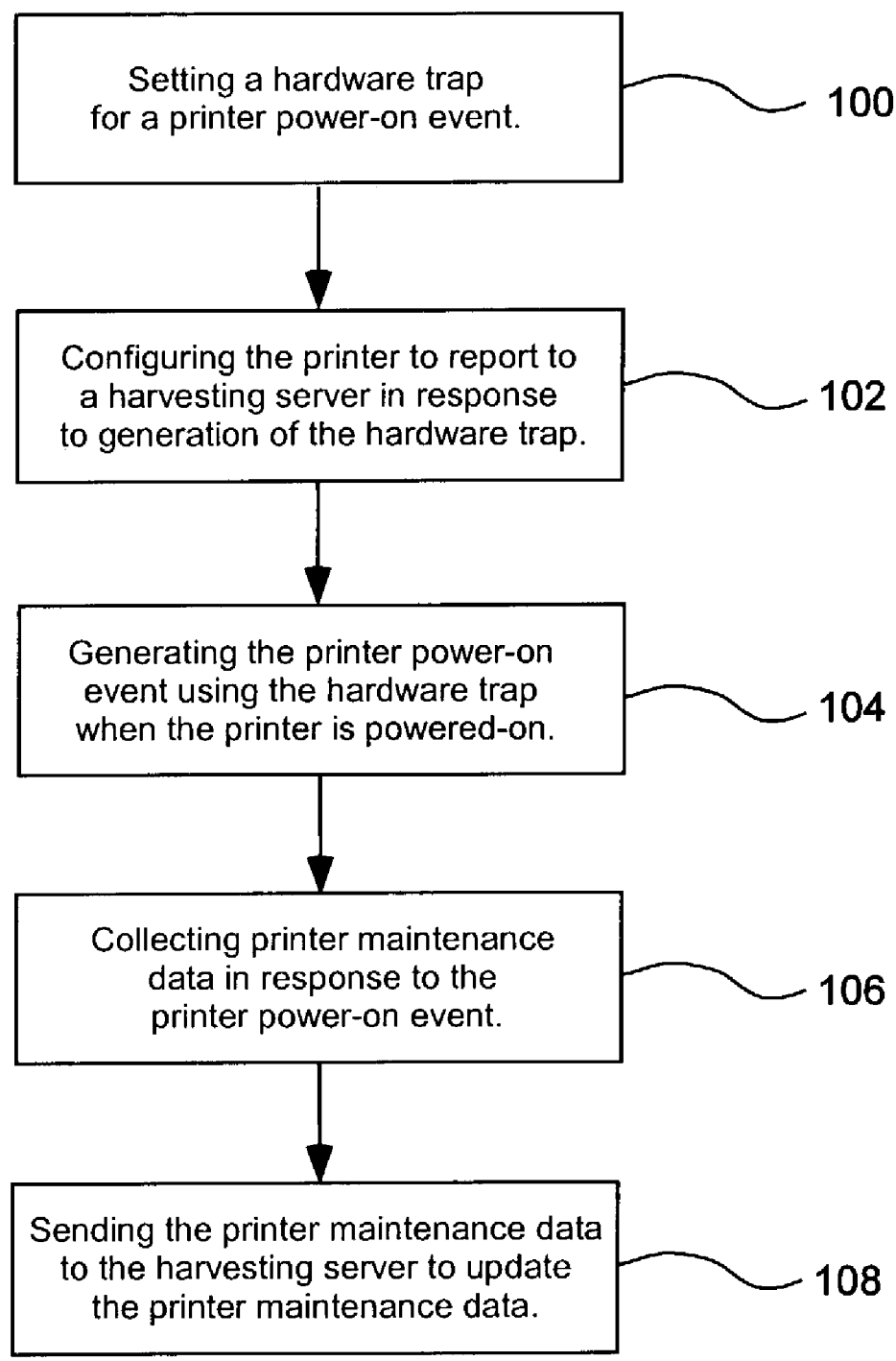
FIG. 3 is a flow chart depicting a method for asynchronous reporting of printer maintenance data in a printer in an embodiment of the invention.

Another embodiment of the invention provides a method for asynchronous reporting of printer maintenance data in a printer as depicted in the flow chart of FIG. 3. The method includes the operation of setting a hardware trap for a printer power-on event in the printer in block 100. The hardware trap is configured to report to a harvesting server in response to generation of the hardware trap in block 102. A further operation is generating the printer power-on event using the hardware trap when the printer is powered-on in block 104. An additional operation is collecting printer maintenance data in response to the printer power-on event in block 106. The printer maintenance data can include the printer consumables' status which typically includes toner, ink, printer drums, printer belts, and printer replacement parts. Service data can also be included in the printer maintenance data, such as an estimated time before the next service visit. In addition, the printer maintenance data that has been collected is sent to the harvesting server in order to update the printer maintenance data stored by the harvesting server in block 108. The printer maintenance data can be sent to the harvesting server using a network communication protocol such as hypertext transfer protocol (HTTP), email, or a proprietary communication protocol. Once the harvesting server receives the printer maintenance data, then the data can be formatted and compiled.

The method can include the further operation of sending the printer maintenance data from the harvesting server to a performance database located with a printer vendor. The performance database contains the printer maintenance data from one or more customer printers and can be used to determine the printer consumables or services to be provided for the customer printers. After a printer vendor has decided what printer consumables or services should be provided based on the printer maintenance data in the performance database, then the consumables can be delivered or services rendered at a customer location for the customer printers.

Figure 4:
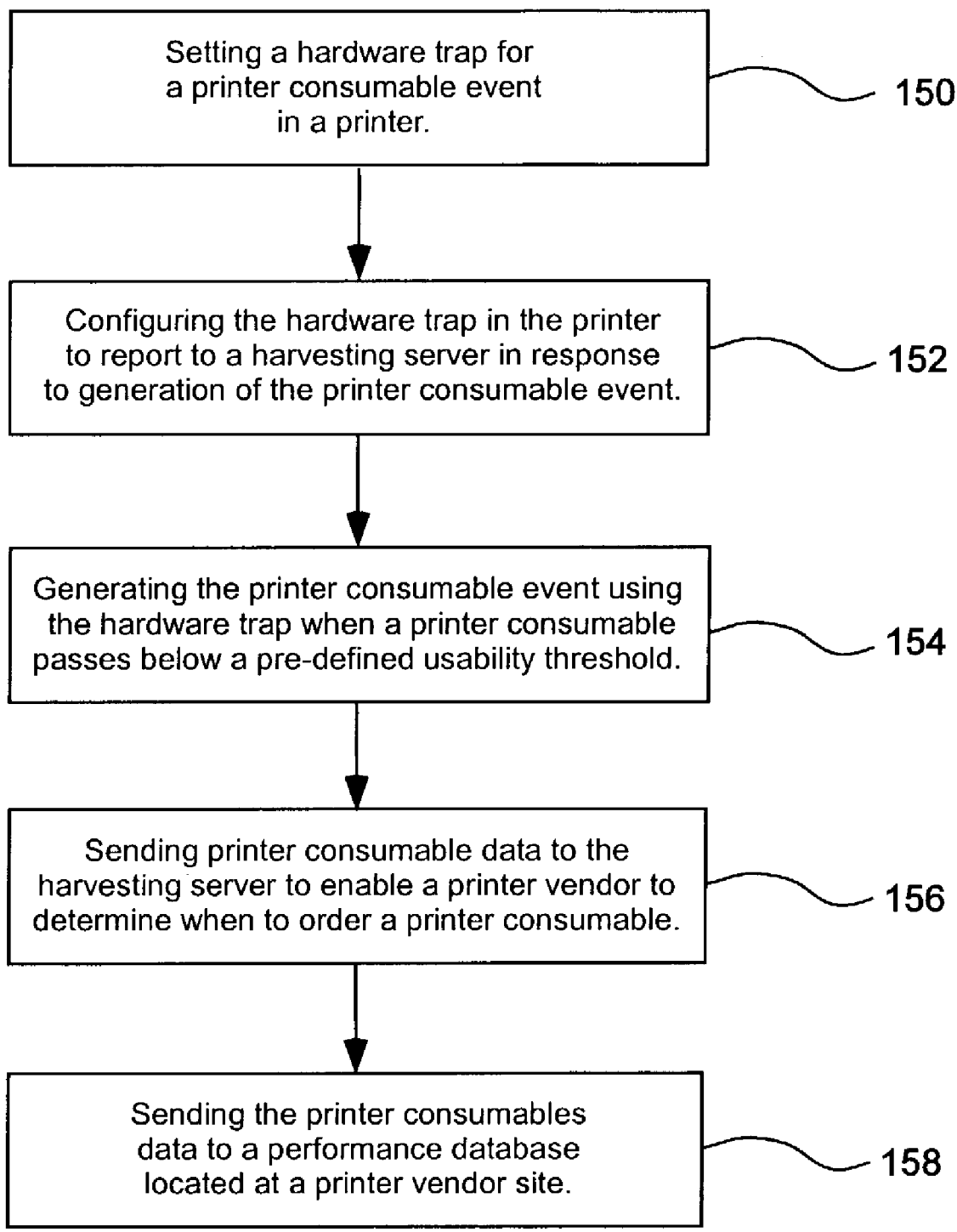
FIG. 4 is a flow chart depicting a method for asynchronous reporting of a printer consumable event in a printer.

FIG. 4 illustrates another embodiment of the present invention that includes a method for asynchronous reporting of a printer maintenance status. This method uses a hardware trap that is activated upon a specific maintenance event or group of events for the printer as opposed to being generated when the printer is powered-on.

The method includes the operation of setting a hardware trap for a printer consumable event in the printer in block 150. The hardware trap in the printer is configured to report to a harvesting server in response to generation of the printer consumable event by the hardware trap in block 152. A further operation is generating the printer consumable event using the hardware trap when a printer consumable passes below a pre-defined usability threshold in block 154. The pre-defined usability threshold is a level at which consumables such as toner, ink, belts, drums, gears and other replaceable printer items are scheduled to be replaced. For example, the pre-defined usability threshold for an ink jet cartridge may be when the ink cartridge falls below 10% full. In addition, printer consumable data is sent to the harvesting server for the printer to enable a printer vendor to determine when to order a printer consumable for the printer in block 156. A further operation is sending the printer consumables data to a performance database located at a printer vendor site in block 158.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for asynchronous reporting of printer maintenance data in a printer, comprising the steps of:
   setting a hardware trap for a printer power-on event in the printer;
   configuring the hardware trap to report to a harvesting server in response to generation of the hardware trap;
   generating the printer power-on event using the hardware trap when the printer is powered-on;
   collecting printer maintenance data in response to the printer power-on event; and
   sending the printer maintenance data that has been collected, to the harvesting server in order to update the printer maintenance data stored by the harvesting server.

2. A method as in claim 1, wherein the step of sending the printer maintenance data further comprises the step of sending the printer maintenance data to the harvesting server using a network communication protocol.

3. A method as in claim 2, further comprising the step of sending the printer maintenance data to the harvesting server using a network communication protocol that is hypertext transfer protocol (HTTP) or email.

4. A method as in claim 1, wherein the step of collecting printer maintenance data includes the step of collecting a printer consumables' status.

5. A method as in claim 4, wherein the step of collecting the printer consumables' status further comprises the step of collecting the printer consumables' status for printer consumables selected from the group of printer consumables consisting of toner, ink, printer drums, printer belts, and printer replacement parts.

6. A method as in claim 1, further comprising the step of sending the printer maintenance data from a harvesting server to a performance database located with a printer vendor.

7. A method as in claim 6, further comprising the step of using the printer maintenance data from the performance database to determine printer consumables to be ordered for at least one customer printer.

8. A method as in claim 7, further comprising the step of sending printer consumables to a customer location for at least one customer printer based on the printer maintenance data received into the performance database.

9. A method as in claim 1, further comprising the step of formatting and interpreting printer maintenance data in the harvesting server.

10. A system for asynchronous reporting of printer maintenance data, comprising:
    a printer having a hardware trap set to capture a printer power-on event of the printer, said printer being configured to report to a harvesting server in response to the generation of the printer power-on event by the hardware trap;
    a printer status module configured for collecting printer maintenance data in response to the printer power-on event; and
    a harvesting server configured for receiving the printer maintenance data from the harvesting server to update the printer maintenance data stored by the harvesting server.

11. A system as in claim 10, further comprising a performance database located with a printer vendor and the performance database is configured to collect printer maintenance data from one or more harvesting servers, including the printer maintenance of claim 10.

12. A system as in claim 11, wherein the performance database is located on a network that is separated from a harvesting server's network by a firewall.

13. A system as in claim 10, further comprising a customer service center that is enabled to send printer consumables to a customer site for the printer based on the printer maintenance data received into the performance database.

14. A system as in claim 10, wherein the harvesting server is configured to format and interpret the printer maintenance data received by the harvesting server.

15. A system as in claim 10, wherein the printer maintenance data is sent to the harvesting server using a network communication protocol.

16. A system as in claim 15, further comprising the step of sending the printer maintenance data to the harvesting server using a network communication protocol that is hypertext transfer protocol (HTTP) or email.

17. A system as in claim 10, wherein printer maintenance data includes the status of printer consumables.

18. A system as in claim 17, wherein the status of printer consumables further comprises the status of printer consumables selected from the group of printer consumables consisting of toner, ink, printer drums, printer belts, and printer replacement parts.

19. A method for asynchronous reporting of a printer maintenance status, comprising the steps of:
    setting a hardware trap for a printer power-on event in a printer;
    configuring the hardware trap in the printer to report to a harvesting server in response to generation of the hardware trap;
    generating the printer power-on event using the hardware trap when the printer is powered on; and
    sending printer maintenance data to the harvesting server for the printer to enable a printer vendor to determine when to order printer consumable for the printer based on the maintenance data.

20. A method as in claim 19, wherein the step of sending the printer maintenance data further comprises the step of sending printer consumables data to a performance database located at a printer vendor site.

21. A system for asynchronous reporting of a printer maintenance status, comprising:
    a printer having a hardware trap set to capture a printer power-on event;
    a harvesting server configured for receiving printer consumable data from the printer to update the printer consumable data, wherein the printer is configured to report printer consumable data to the harvesting server in response to the generation of the hardware trap; and
    a performance database located with a printer vendor, the performance database being configured to collect printer consumable data from the harvesting server.

22. A system as in claim 21, further comprising a customer service center that is enabled to send a printer consumable to a client site for the printer based on the printer consumable data received in the performance database.

23. A system for asynchronous reporting of printer maintenance data, comprising:
    a printer means having a hardware trap means for capturing a printer power-on event and the printer means is configured for reporting to a harvesting server in response to the generation of the printer power-on event by the hardware trap means;
    a printer status means for collecting printer maintenance data in response to the printer power-on event;
    a harvesting means for receiving printer maintenance data from the printer status means to update the printer maintenance data stored by the harvesting means; and
    a performance database means for collecting printer maintenance data from one or more harvesting means and the performance database means is located with a printer vendor.

24. A system as in claim 23, further comprising a customer service means that is enabled to send printer consumables to a customer site for the printer means based on the printer maintenance data received into the performance database means.

25. An article of manufacture, comprising:
    a computer usable medium having computer readable program code embodied therein for asynchronous reporting of printer maintenance data in a printer, the computer readable program code means in the article of manufacture comprising:
    computer readable program code for setting a hardware trap for a printer power-on event in the printer;
    computer readable program code configuring the hardware trap to report to a harvesting server in response to generation of the hardware trap;
    computer readable program code for generating the printer power-on event using the hardware trap when the printer is powered-on;
    computer readable program code for collecting printer maintenance data in response to the printer power-on event; and
    computer readable program code for sending the printer maintenance data that has been collected, to the harvesting server in order to update the printer maintenance data stored by the harvesting server.

* * * * *